Patented Feb. 11, 1936

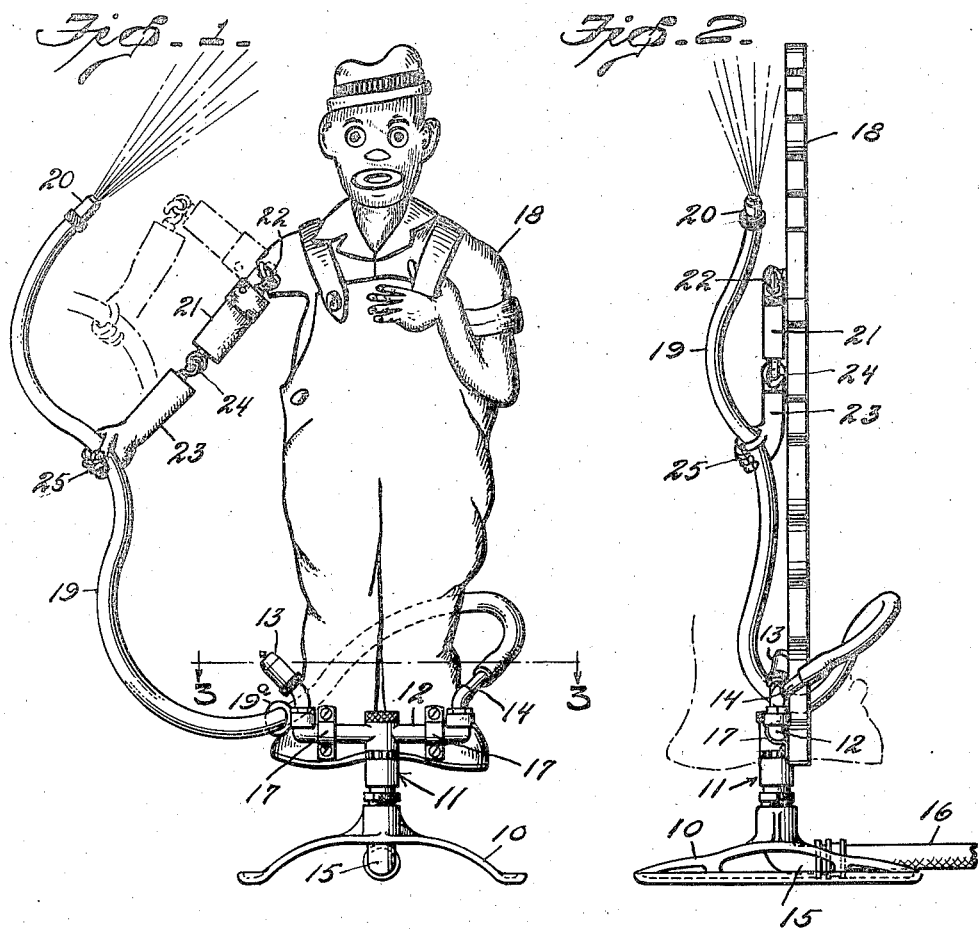

2,030,605

UNITED STATES PATENT OFFICE 2,030,605

LAWN SPRINKLER

Ninian R. Moore, Du Bois, Pa.

Application March 12, 1935, Serial No. 10,713

7 Claims. (Cl. 299—65)

The invention relates to water sprinklers and has for its general object the provision of a novel lawn sprinkler of what is known as the "wiggler" type.

An important object of the invention is to provide a lawn sprinkler embodying a rotary head carrying a flexible hose mounted on a jointed support so that as the device rotates the hose will be given a constantly varying motion which will act to distribute the water over a large area and in such a manner that no excessive amount will be concentrated upon any particular spot as is so frequently the case where use is made of a spray head or nozzle moving in an absolutely fixed path.

Another object of the invention is to provide a rotary lawn sprinkler embodying a hose supporting member constructed as the representation of a humorous, grotesque or other desired human figure which is mounted upon the head and which has a jointed arm connected with and carrying the flexible hose, the entire arrangement being such that when water is supplied to the device the head carrying the representation of the figure will be rotated, while at the same time the jointing of the arm will permit the hose to be flourished around or wiggled as if it were swung about erratically by the figure, thereby not only efficiently sprinkling the lawn but also creating a highly amusing appearance which will be quite entertaining to spectators.

Another object is to provide a sprinkler of this character which will harmonize and be in accord with the present vogue of placing gaily painted figures of children, birds, animals and the like about lawns for ornamental purposes.

An additional object is to provide a device of this character which may make use of an already existing rotary sprinkler or which may be of special design in this respect, the entire device being moreover simple and inexpensive to make and assemble, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a front elevation of the device, the movability of the arm and hose being indicated by dot and dash lines, Figure 2 is a side elevation, Figure 3 is a cross section taken on the line 3—3 of Figure 1.

Referring more particularly to the drawing, I have shown the device as comprising a base 10, conveniently formed as a casting and having mounted thereon in any suitable or preferred manner a rotary head 11 which may be T-shaped or which includes laterally extending arms 12 one of which may or may not be equipped with a reaction jet 13 and the other of which is equipped with an angularly extending outlet 14. Extending up through the base for communication with the rotary head 11 is an inlet connection 15 to which a lawn hose 16 is connected.

Secured upon the head 11 as for example by means of a pair of clamps or clips 17 is an upstanding figure 18 which may be of any desired height and material and which is intended, in accordance with my invention, to be the representation of a human figure, for instance an overall clad colored boy as shown in the drawing though this is merely indicative of the idea involved and not at all restrictive or limitative as it is obviously within the purview of the invention to provide any other figure in accordance with the preference of the manufacturer, the principal idea being that a figure of this type would naturally be perhaps somewhat grotesque and/or amusing. Such a figure may be readily sawed out of a board or could just as easily be made as a metal stamping and would of course be finished in appropriate and bright colors so as to have an attractive appearance.

One of the features of the invention is the provision of a jointed arm which carries a length of flexible hose 19 connected at one end with the outlet connection 14 and having its other end provided with a suitable spray nozzle 20 of any ordinary or preferred type. The hose 19 is shown as extending across back of the figure and braced or connected at the opposite edge thereof by a band or clip 19ª. This supporting arm for the discharge hose 19 is represented as including an upper arm section 21 loosely and movably connected at 22 with the shoulder of the figure, and a lower arm section 23 loosely and movably connected at 24 with the upper arm section and terminating in a hand 25 through which the discharge hose 19 may be extended or which may be connected with the hose in any other convenient manner. While it is true that different types of connections might be provided at the joints 22 and 24 a very simple and yet efficient construction at these points may consist of interengaged rings or eyes as shown as they will be capable of almost universal movement.

Assuming that water under pressure is supplied to the device through the hose 16, or through a rigid pipe if such is preferred, it will be seen that the water flowing through the head 11 and arms 12 would pass out through the reaction jet 13 and the outlet connection 14. Incidentally it might be mentioned that the jet 13 is not necessary and may be omitted or closed if desired as actual demonstration discloses the fact that in its absence the head will rotate, carrying with it the figure 18 and the discharge hose 19. As the figure turns, the reaction caused by water ejected from the nozzle 20, and also the centrifugal force exerted upon the discharge hose will cause it to wiggle or swing about in a very erratic manner, the slight variations in the pressure and the other conditions present causing the jointed arm sections to move about with respect to each other and with respect to the figure, thereby enhancing the erratic movement of the discharge hose and making it appear that the figure is actually swinging the hose violently around as if working most industriously at his job of sprinkling the lawn. In actual practice the effect is very amusing and entertaining to spectators while at the same time the constantly changing direction of the spray issuing from the nozzle 20 insures a thorough hosing of the lawn.

From the foregoing description and a study of the drawing it will be apparent that I have thus provided an extremely simple and consequently inexpensive device for the purpose specified and one which will be very attractive in its appearance and action. It is thought from the above that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A sprinkler of the character described comprising a base equipped with a water inlet, a rotary head mounted on said base and having an outlet, an upstanding support mounted on said head, a flexible discharge hose connected with said outlet and equipped with a spray nozzle, and means swingably connected with said support and connected with the intermediate portion of said discharge hose.

2. A sprinkler of the character described comprising a relatively stationary base having an inlet for connection with a water supply line, a head rotatably mounted upon said base and in communication with said inlet, said head including oppositely extending arms, an outlet connection on one of said arms, an upstanding support formed as the representation of a human figure mounted on said head, a jointed arm movably connected with a shoulder portion of said figure, and a flexible discharge hose connected at one end with said outlet connection, equipped at its other end with a spray nozzle and having its intermediate portion carried by said jointed arm.

3. A sprinkling device of the character described comprising a relatively stationary base having a water inlet for connection with a supply line, a head rotatably mounted on said base and communicating with said inlet, said head including oppositely extending arms, a laterally inclined outlet on one of said arms, an upstanding support carried by said arms and formed as the representation of a human figure, an upper arm section loosely and movably connected to the shoulder portion of said figure, a lower arm section loosely and movably connected with the upper arm section, and a flexible discharge hose connected at one end with said outlet and equipped at its other end with a spray nozzle, and having its intermediate portion connected with said lower arm section.

4. A sprinkling device of the character described comprising a relatively stationary base having a water inlet for connection with a supply line, a head rotatably mounted on said base and communicating with said inlet, said head including oppositely extending arms, a laterally inclined outlet on one of said arms, an upstanding support carried by said arms and formed as the representation of a human figure, an upper arm section loosely and movably connected to the shoulder portion of said figure, a lower arm section loosely and movably connected with the upper arm section, and a flexible discharge hose connected at one end with said outlet and equipped at its other end with a spray nozzle, and having its intermediate portion connected with said lower arm section, the connection between the arm sections and between the upper arm section and said shoulder portion consisting of interengaged rings.

5. A sprinkler comprising a base, a rotary head mounted on said base and having an outlet and an inlet, an upstanding support carried by said head, a flexible discharge hose connected with said outlet, and a supporting element for the hose connected with the intermediate portion thereof and pivotally connected with said upstanding support.

6. A sprinkler of the character described comprising a base having an inlet for connection with a water supply line, a head rotatably mounted upon said base and in communication with said inlet, an outlet on said head, an upstanding support formed as the representation of a figure mounted on said head, a jointed supporting element pivotally connected with said figure, and a flexible discharge hose connected with said outlet and having its intermediate portion carried by said jointed element.

7. A sprinkler comprising a base having a water inlet connection, a head rotatably mounted upon said base in communication with said inlet and provided with an outlet connection, an upstanding support carried by said head, an arm pivotally connected with said support and formed of jointed sections, and a flexible discharge hose connected with said outlet connection and having its intermediate portion carried by said jointed arm.

NINIAN R. MOORE.